US011612468B2

(12) United States Patent
Benz et al.

(10) Patent No.: US 11,612,468 B2
(45) Date of Patent: Mar. 28, 2023

(54) POLYMERIZATION AND POST-TEMPERING DEVICE

(71) Applicant: Ivoclar Vivadent AG, Schaan (LI)

(72) Inventors: Oliver Benz, Schaan (LI); Stefan Geissbühler, Langenthal (CH)

(73) Assignee: Ivoclar Vivadent AG, Schaan (LI)

( * ) Notice: Subject to any disclaimer, the term of this patent is extended or adjusted under 35 U.S.C. 154(b) by 521 days.

(21) Appl. No.: 16/795,792

(22) Filed: Feb. 20, 2020

(65) Prior Publication Data
US 2020/0281706 A1  Sep. 10, 2020

(30) Foreign Application Priority Data
Mar. 6, 2019  (EP) .................................... 19161119

(51) Int. Cl.
| A61C 13/15 | (2006.01) |
| B01J 19/00 | (2006.01) |
| B01J 19/12 | (2006.01) |
| B33Y 10/00 | (2015.01) |
| B33Y 80/00 | (2015.01) |
| B33Y 40/20 | (2020.01) |
| A61C 13/09 | (2006.01) |

(52) U.S. Cl.
CPC ......... *A61C 19/003* (2013.01); *B01J 19/0073* (2013.01); *B01J 19/123* (2013.01); *A61C 13/09* (2013.01); *B33Y 10/00* (2014.12); *B33Y 40/20* (2020.01); *B33Y 80/00* (2014.12)

(58) Field of Classification Search
CPC .... A61C 19/003; A61C 13/09; B01J 19/0073; B01J 19/123; B33Y 10/00; B33Y 80/00; B33Y 40/20
See application file for complete search history.

(56) References Cited

U.S. PATENT DOCUMENTS

| 3,398,040 A * | 8/1968 | Allen ................ B32B 17/10018 156/247 |
| 4,516,195 A * | 5/1985 | Gonser ................ A61C 19/003 250/493.1 |
| 4,608,622 A * | 8/1986 | Gonser ................ A61C 19/003 250/493.1 |
| 4,839,521 A | 6/1989 | Oppawsky |
| 5,104,591 A * | 4/1992 | Masuhara ............ A61C 19/003 264/16 |
| 2020/0246120 A1* | 8/2020 | Benz ..................... B29C 64/245 |

FOREIGN PATENT DOCUMENTS

| JP | 2002186632 A | 7/2002 |
| JP | 3144409 U | 8/2008 |

* cited by examiner

*Primary Examiner* — Nicholas D Lucchesi
(74) *Attorney, Agent, or Firm* — Ann M. Knab; Thad McMurray

(57) ABSTRACT

The invention relates to a polymerization and post-tempering device (10) for tempering, in particular post-tempering, dental restoration parts (54) made of polymerizable plastics. At least one light source (38) which emits light in the visible and/or ultraviolet wavelength range and a light chamber with a door (14) to the light chamber are provided. The door (14) comprises a window (20) with a window pane (22) which consists of at least two layers (56, 58) whose layer facing the light chamber reflects at least 90%, in particular approximately 95%, of light, and whose layer facing away from the light chamber filters out UV light and/or blue light.

19 Claims, 6 Drawing Sheets

POLYMERIZATION AND POST-TEMPERING DEVICE

CROSS-REFERENCE TO RELATED APPLICATIONS

This application claims priority to European patent application No. 19161119.3 filed on Mar. 6, 2019, the disclosure of which is incorporated herein by reference in its entirety.

FIELD OF INVENTION

The invention relates to a polymerization and post-tempering device for tempering dental restoration parts made of polymerizable plastics. A polymerization and post-tempering device which is suitable for post-tempering dental restoration parts which are made by stereolithography is particularly preferred.

BACKGROUND

Studies have shown that post-tempering which is also referred to as post-curing is crucial for the strength and quality of produced dental restoration parts.

Thus, post-tempering devices have been known for long into which the dental restoration parts produced by stereolithography are inserted and subjected to the effect of the UV light source.

Here, closing the amount of light is important as too intensive exposure to UV light causes yellow coloration and premature aging of the dental restoration parts.

On the other hand, an insufficient degree of polymerization due to a tempering time which is too short may lead to non-polymerized parts remaining in the component, i.e. in the dental restoration part.

On the other hand, free radicals are suspected to cause cancer in the mouth of a patient.

This is suggested by a respective study "Assessing and Reducing the Toxicity of 3D-Printed Parts", Mr. Shirin Mesbah Oskuit et al., published in the Environ. Sci. Technol. Lett., 2016 3(1), pages 1 to 6, published by the American Chemical Society.

Also, visual inspection of the treated component during the post-tempering or post-curing process is important. Thus, post-tempering devices typically comprise a window which allows for inspection of the component.

According to safety regulations, the light sources are to be turned off while the viewer observes the components. This is to prevent the viewer from being harmed by the UV share of the applied post-curing radiation.

Furthermore, screens have been attached to the window to block direct view of the interior of the post-curing device, i.e. the light chamber. Screens of this type are unergonomic but required to ensure that no damage is caused during the exposure time by accidentally looking in the direction of the window.

To reliably exclude damage in this respect, it has also been suggested to configure the window in the door of the polymerization and post-tempering device to be closeable by a slider, and to turn on the light source only when the slider is closed.

This reliably excludes harm to the viewer but is unfavorable for the curing process as the UV radiation should best be supplied to the component continuously.

SUMMARY

Thus, the invention is based on the task of providing a polymerization and post-tempering device, in particular for components such as dental restoration parts which consist of polymerizable plastics, which allows for ergonomic handling of the control of the polymerization and post-tempering device without risking adverse health effects.

This task is inventively solved by the claims. Advantageous developments may be taken from the subclaims.

According to the invention it is particularly favorable that the component can now be inspected even while it is exposed to light without risking adverse health effects. This eliminates malfunction by means of screens, brief switching off or the danger in terms of unprotected viewing of the UV radiation.

According to the invention, this is realizable by combination with a special window pane which consists of two layers, namely of a layer having a surface reflective to the inside facing the light chamber and of a layer having an edge filter for UV light, or even for blue light, facing the viewer.

According to the invention, the spectrum of the emitted radiation which passes through the door is reduced considerably and purposefully at critical positions. The reflection on the inside of the window pane reflects the radiation to a large extent such that only e.g. 5 to 10% of the radiation passes through the semi-transparent mirror provided thereat.

This residual radiation is subjected to an edge filter which completely absorbs the UV share.

Tests have shown that this method ensures that less than 1% of the emitted UV radiation may enter the eye of the viewer corresponding to a close which is considerably smaller than the UV radiation of the sun on a summer's day.

According to the invention, the combination of both mentioned layers is particularly favorable as without the inner layer the outer layer would absorb UV radiation rich in energy to such an extent that it ages quickly, heats or even melts, depending on the intensity of exposure.

Even if the inventive polymerization and post-tempering device is referred to as such, it is justified likewise to refer to it as a curing device instead. This is the case as the precuring process—and thus also a curing process—takes place in the stereolithography device already.

According to the invention it is provided that the light emitted by the light source of the polymerization and post-tempering device is treated specially:

On the one hand, it impinges on the dental restoration part which is situated in the light chamber and illuminates it in this respect. Typically, the light source emits both visible light and ultraviolet light having a wavelength curve ranging from 380 nm to 510 nm and having e.g. two emission maxima at approximately 410 and approximately 470 nm.

A large share of the polymerization, i.e. the post-curing or post-tempering, is achieved e.g. by the ultraviolet or near-ultraviolet range of the emission curve. Of course, this is material-dependent wherein other wavelengths are also conceivable. In this respect, this range is particularly energy-intensive.

The light chamber is mirrored on the inside and thus ensures that the light emitted by the light source impinges on the one or more dental restoration parts from all sides. Thus, the emitted light also impinges on the door which occupies one of the six walls of the rectangular light chamber.

The door, too, is mirrored on the inside, i.e. towards the light chamber. According to the invention, it comprises a window having a window pane, said window allowing for inspection of the one or more dental restoration parts and also of light incidence thereon.

The window and the associated window pane is configured specially inventively. The door comprises a door leg which is mounted pivotably at the door frame and receives the window approximately in the horizontal and vertical center.

The window has a width of approximately 5 cm, e.g. between 4 and 10 cm, and a height of approximately 20 cm, e.g. between 12 and 35 cm.

In this respect, the window is a rectangular window arranged upright having a height-to-width ratio of between 2 to 1 and 10 to 1.

When viewed from the outside, the window pane of the window is configured to be low-lying, i.e. adjacent to the inside of the door.

This arrangement has the advantage that objects above a certain diameter impinging from the outside cannot touch the window pane, but are detained by the door leg.

According to the invention, it is uncritical when the viewer looks into the light chamber through the window continuously for a longer period of time. Protective goggles are not necessary any longer inventively.

According to the invention, the window pane is configured from two layers wherein the number two is not to be understood in a limiting fashion herein but in terms of at least two layers.

The inner layer, i.e. the layer facing the light chamber, is reflective at least towards the inside. It may be a glass pane, for instance, which is damped with a reflective material such as aluminum. These reflective properties are selected such that the ratio of reflected light to transmitted light is considerably larger than one. For instance, 90 to 95% of the impinging light is reflected and 5 to 10% is let through.

Typically, such a damping process has a non-linear transmission characteristic such that both visible light and ultraviolet light is let through in unequal parts.

An outer layer is attached on the inner layer, preferably without air cushions in between. This arrangement has the advantage that not two, but only one media boundary is present thereat such that light getting from the inner layer to the outer layer is only refracted once thereat.

The outer layer consists preferably of transparent and colored plastic which filters out UV light almost completely and blue light to a certain extent or almost completely. White and orange light is primarily emitted at the end.

In this respect, this plastic layer acts like an edge filter.

It is also favorable that the outer layer consisting of plastic forms a splinter protection for the inner layer consisting preferably of glass. Any pointed objects impinging thereupon hit the less brittle plastic layer such that the risk of damage is low.

In a modified configuration, a window pane is reflective on the inside, i.e. towards the light chamber, e.g. damped with aluminum, and damped with an edge filter on the outside.

The window pane may consist of plastic and/or laminated glass or of bulletproof glass. It may have a thickness of 2 to 10 mm.

It is preferred that the refractive indices of the layers of the window pane differ from one another by less than 50%, preferably less than 25%.

It is also favorable that the window pane is received in a window frame. The window frame is provided on the inside of the door leg in the manner of a recess and receives the window pane such that the inner side of the door leg lies flush. In this respect, the depth of the recess corresponds to the thickness of the window pane.

In an inventively favorable manner, the outer part of the window pane, insofar as it overlaps the door leg, is covered by a screen. The screen extends across the entire inside of the door except for a section which forms the window. The screen is configured from a non-transparent material, e.g. aluminum. Preferably, its inside is metallic reflective in any case such that radiation emitted by the light source is reflected thereat in any case. Alternatively, the screen may also consist of plastic with a reflective coating on the inside.

Both an elastic seal and a labyrinth seal are configured at the transition between the door frame and the door leg. The elastic seal is a circumferential band made of an elastomer which is configured either on the screen or on the door frame. The labyrinth seal comprises an L or a more complicated profile which traps and absorbs any light radiation passing through the elastic seal. In this respect, the labyrinth seal is preferably colored black.

The door frame preferably comprises a joint to which the door leg is mounted pivotably. The closed state of the door leg is ensured by permanent magnets which are attached to either the door frame or the door leg in the corners, wherein respective suitable ferromagnetic elements are attached to the other component respectively, i.e. the door frame or the door leg.

BRIEF DESCRIPTION

Further advantages, details and features may be taken from the following description of an exemplary embodiment of the invention in conjunction with the drawings, in which.

DETAILED DESCRIPTION

Figure 1:
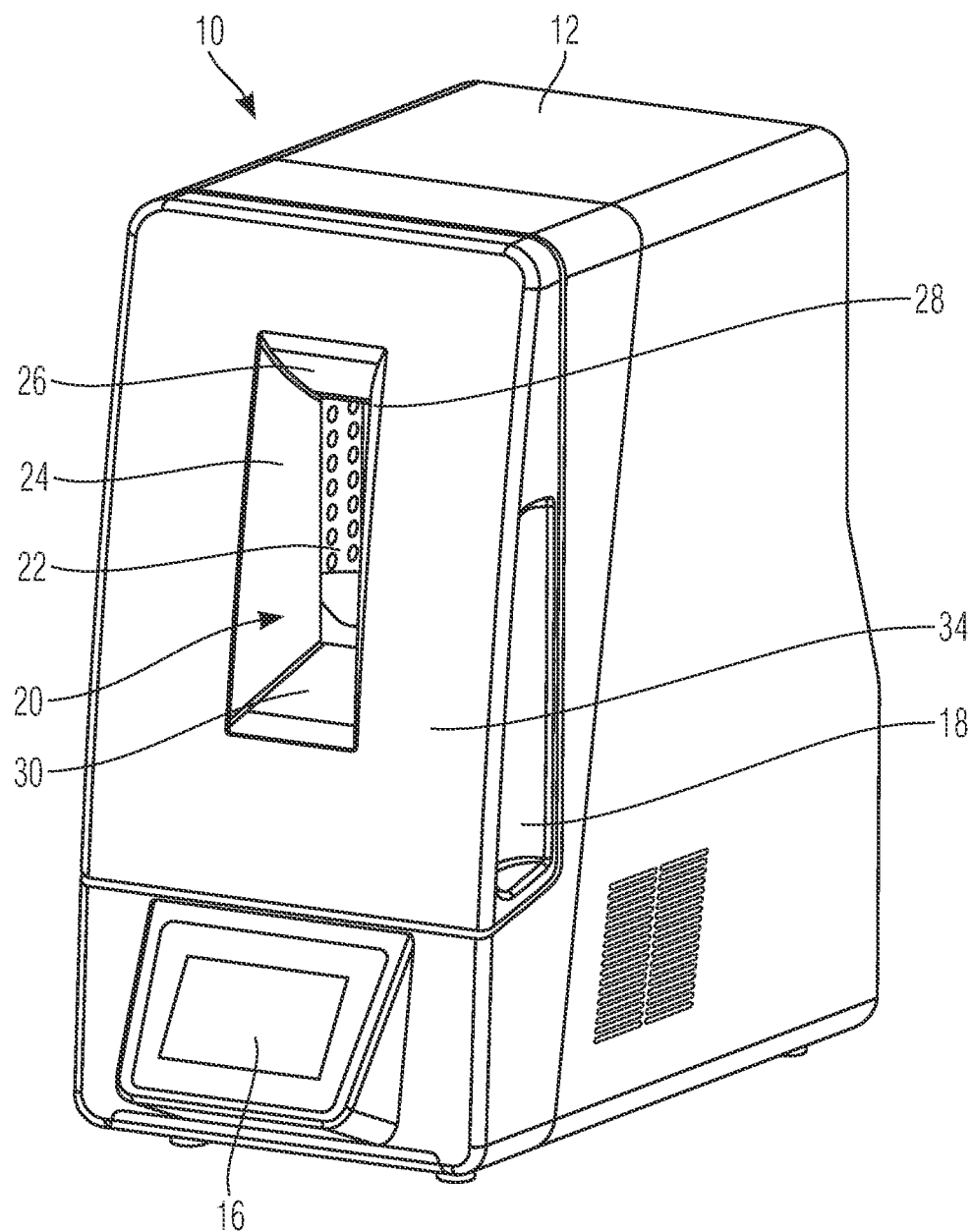
FIG. 1 shows an embodiment of an inventive polymerization and post-tempering device with the door closed in a perspective illustration.

The embodiment of the polymerization and post-tempering device 10 illustrated in FIG. 1 comprises a housing 12 with a door 14. The door 14 occupies the front side of the housing 12, except for a lower region which carries a display and operating device 16.

In the illustrated exemplary embodiment the door 14 comprises an access opening 18 on the right side. It is hinged on the left side, and by pressure on the access opening 18 the door 14 may be opened and thus enables access to a light chamber 36 in the polymerization and post-tempering device 10.

The door 14 further comprises a window 20. It extends upright and has a height-to-width-ratio of approximately 1 to 4. The window 20 comprises a window pane 22 which is configured inventively in a special manner, and it is also referred to in the following remarks for this purpose.

The window pane 22 is surrounded by slightly convexly curved inclined surfaces 24, 26, 28 and 30 which extend to the front side 32 of the door legs 34 and which ensure that the window pane 22 is configured in a low-lying manner.

The window pane 22, the window 20 and accordingly also the associated inclined surfaces 24 to 30 are arranged centrally at the door 14. Although the window pane 22 is configured to be relatively narrow and low-lying, it is possible to look into the inside of the polymerization and post-tempering device 10 also obliquely from the side as the inclined surfaces 24 and 28 diverge from one another.

Figure 2:
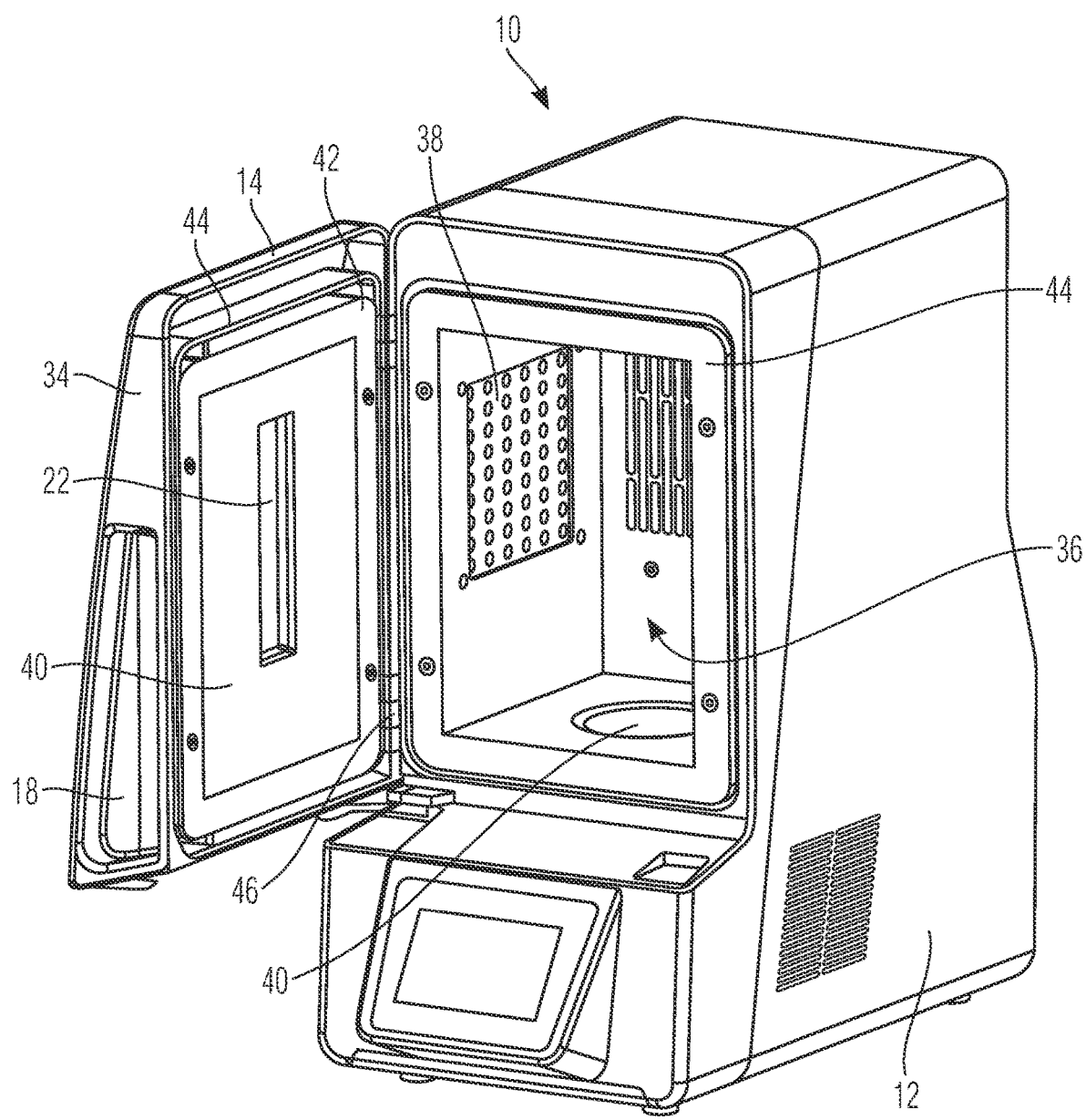
FIG. 2 shows the embodiment according to FIG. 1 with the door open.

The polymerization and post-tempering device 10 is apparent from FIG. 2 with the door 14 open. A light chamber 36 with light sources 38 is realized in the interior of the polymerization and post-tempering device 10. The light sources 38 polymerize and cure a dental restoration part which is not illustrated herein and positioned on a rotary plate 41.

As is apparent from FIG. 2, the window pane 22 is arranged centrally in the door 14. It extends in a relatively narrow fashion and upright. It is covered by a reflective inside 40 of the door on the inside, i.e. towards the light chamber 36. The reflective inside 40 of the door is mirrored on the inside, just like the remaining side walls of the light chamber 36.

A black and in this respect maximally absorbing screen 42 having a seal made of an elastomer rests on the outer edge of the reflective inside 40 of the door. It pushes against a circumferential frame of the door 14 when the door 14 is closed.

Additionally, a labyrinth seal 44 is configured outside of the screen 42, said labyrinth seal acting only when the door 14 is closed.

As is apparent from FIG. 2, the door 14 is hinged to the housing 12 via door hinges 46.

Figure 3:
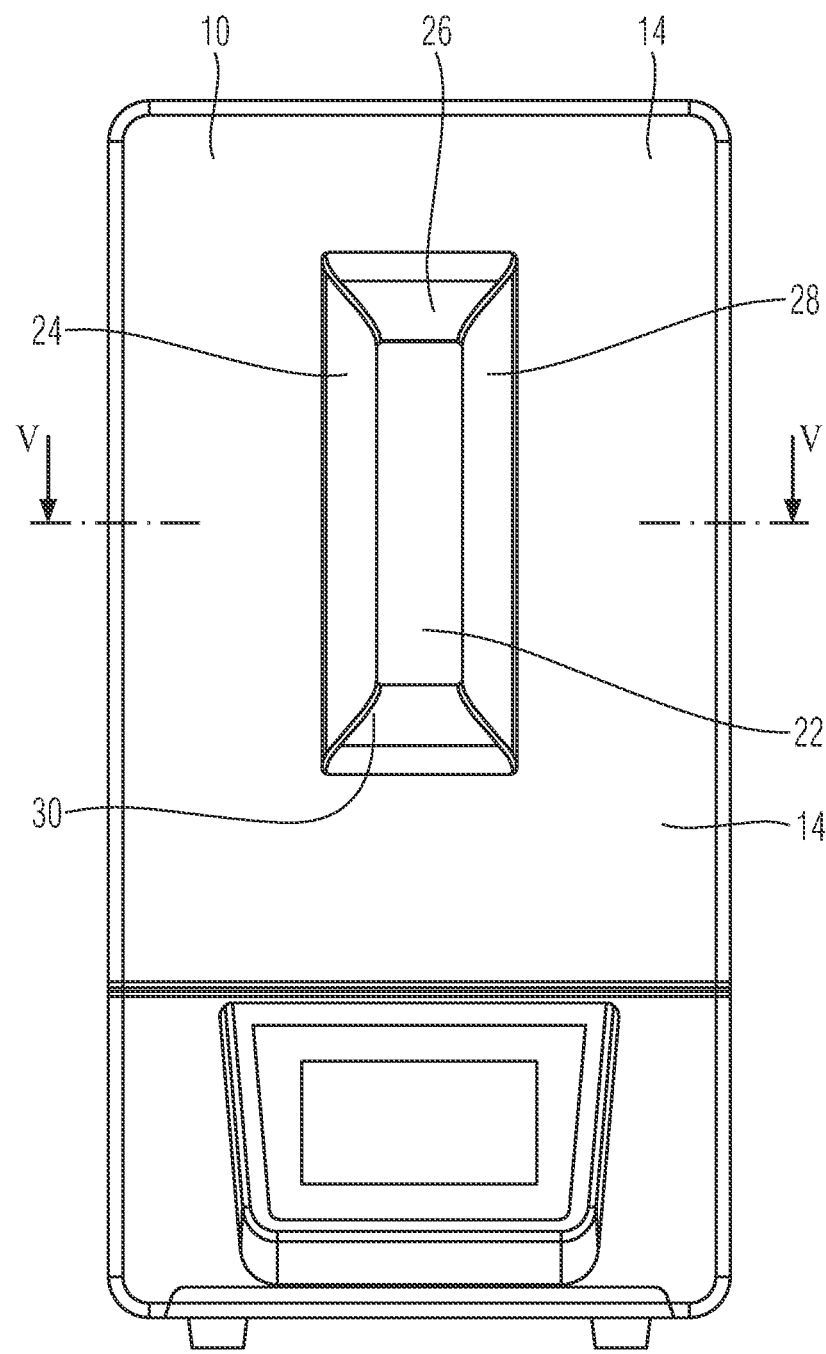
FIG. 3 shows a front view of the inventive polymerization and post-tempering device in the embodiment according to FIG. 1.

FIG. 3 shows a front view of the door 14 with the inclined surfaces 24, 26, 28 and 30. In the closed state, the door 14 occupies practically the entire upper front side 32 of the polymerization and post-tempering device 10.

Figure 4:
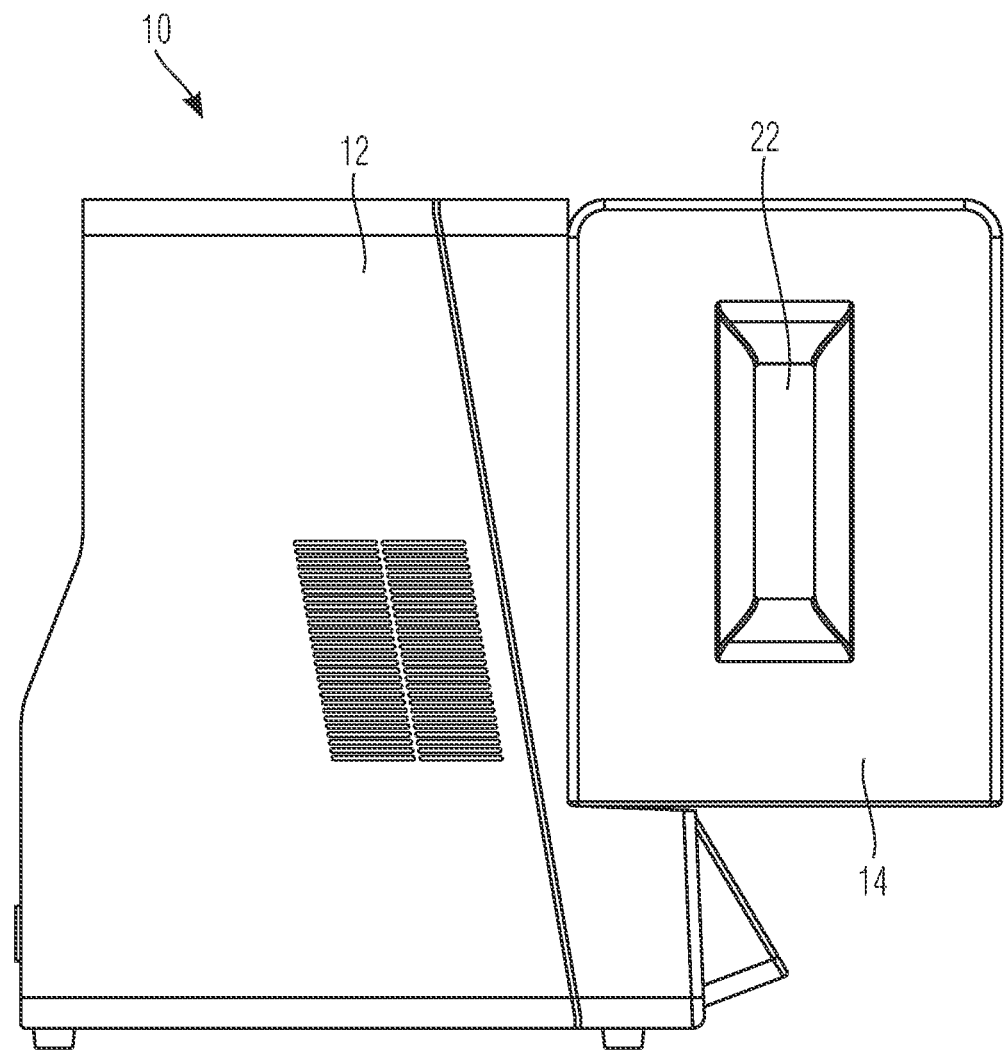
FIG. 4 shows a side view of the inventive polymerization and post-tempering device according to FIGS. 1 to 3 with the door open.

A side view of the polymerization and post-tempering device 10 with the door 14 open is apparent from FIG. 4. The swiveling angle of the door 14 is limited by stops known per se, e.g. to a swiveling angle of 90°.

Figure 5:
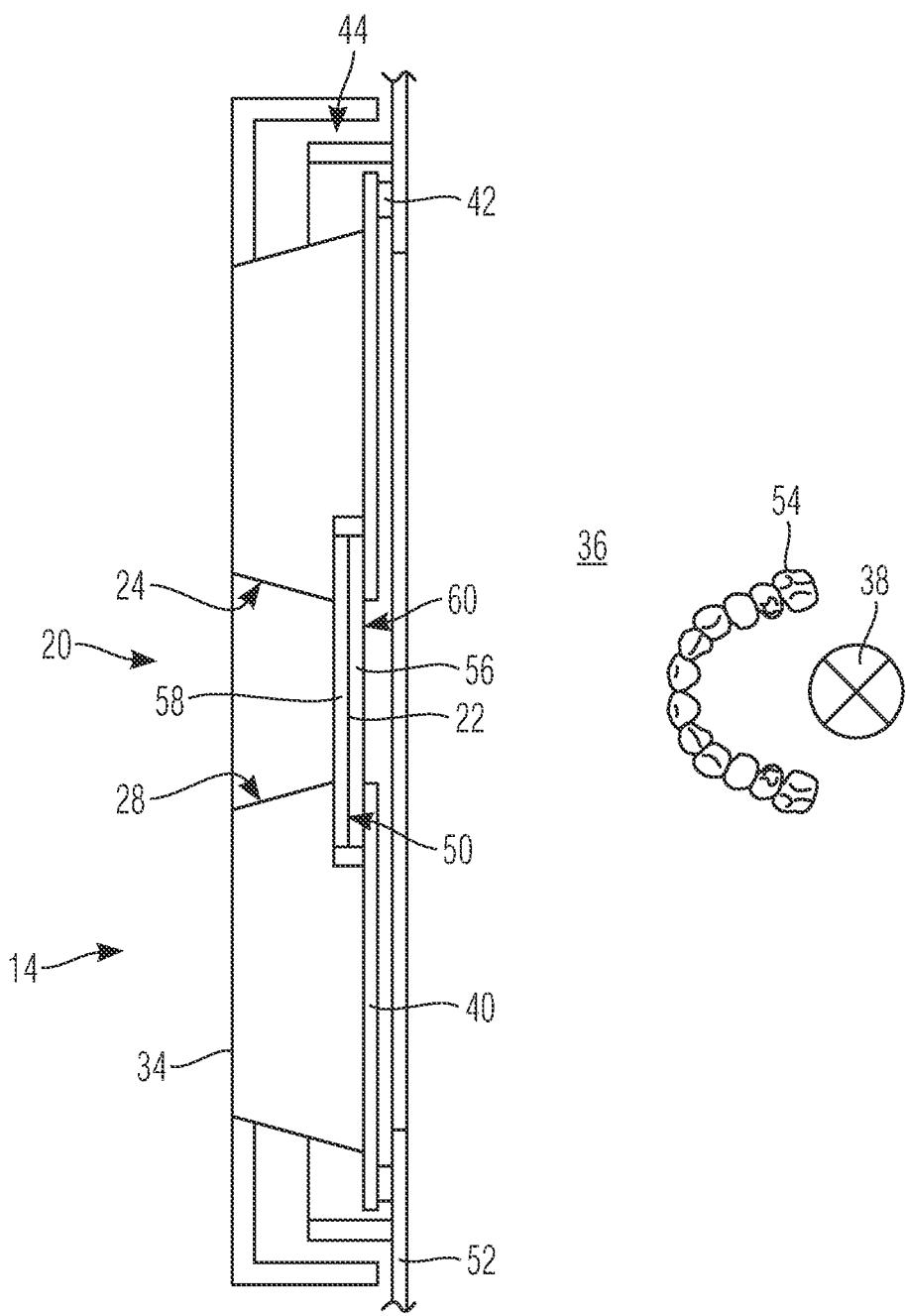
FIG. 5 shows a sectional view along the line V-V according to FIG. 3 through the embodiment of the invention illustrated herein as for the rest.

The construction of a door with an installed inventive window pane 22 is apparent from FIG. 5 in detail.

The window pane 22 is received in a recess 50 in the door leg 34. This region of the recess is covered by the reflective inside 40 of the door.

In a way known per se, the labyrinth seal 44 comprises a labyrinth path which requires multiple redirection of any light radiation and is realized by a corresponding design of the door legs 34 and the door frame 52.

The light source 38 impinges on the light chamber 36 and in particular also on a dental restoration part 54 which is indicated schematically in FIG. 5. The emitted light radiation is reflected on the walls of the light chamber 36 and also on the reflective inside 40 of the door.

The window pane 22 consists of a glass layer 56 and a plastic layer 58. The glass layer 56 is the interior layer and the plastic layer 58 is the exterior layer. The glass layer 56 is provided with a coating 60 on the inside which lets through a small amount of the impinging light radiation, e.g. 5 to 10%, and which reflects 90 to 95% accordingly.

The glass layer 56 comprises a thickness of 2 mm and absorbs e.g. 1% of the impinging radiation passing through.

The plastic layer 58 which may also be deposited by spraying onto the glass layer 56 is configured directly adjacent to the glass layer 56. The plastic layer 58 comprises an edge filter which absorbs UV radiation and lets through visible light to a large extent. In this respect, the transparent plastic layer 58 is pigmented in orange.

Both layers are screwed to one another.

Figure 6:
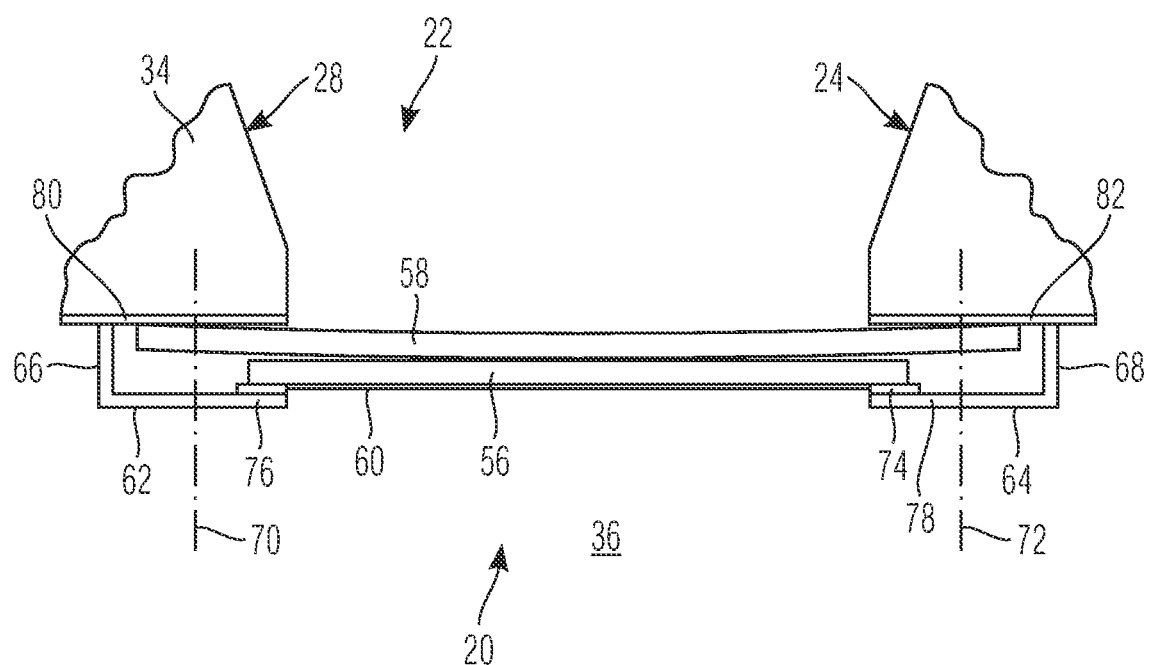
FIG. 6 shows a sectional view through a modified embodiment of the invention.

The configuration of the screw connection of the inventive window 20 in an inventive door 14 is apparent from FIG. 6.

The window 20 consists of a reflection pane 56 and an edge filter pane 58. The reflection pane 56 faces the interior of the curing device 10 and comprises a reflective coating 60. In the relaxed state, the pane 58 is curved slightly. This state is illustrated in FIG. 6.

On both sides of the pane 56 one holder 62 and 64 is provided respectively. Herein, it is configured as an angle plate which pushes the pane 56 towards the door leg 34, respectively.

For this purpose, a leg 66 or 68 is supported on the door leg 34 and a central screw connection 70 or 72 of the holder 62 or 64 pulls the holder to each door leg.

The other leg 76 or 78 of the holder 62 or 64 is pressed onto the pane 56 by means of a circumferential seal 74.

Initially, the pane 56 is pressed onto the pane 58 centrally. The pane 58 consists of plastic and is softer than the pane 56. Thus, the pane 58 deforms as a result of the pressure and then abuts against the pane 56 increasingly also on the outside when the pressure increases.

When the screw connections 70 and 72 are tightened, both panes abut against one another all-over without an air gap but under pretension.

The pane 58 is supported on the door leg 34 by means of seals 80 and 82.

This type of clamping the window pane 22 also allows for a certain thermal stress on the panes 56 and 58; if they expand, they can slide against each other and against the brackets and doors legs as desired and work in this respect, provided that enough clearance is included.

Manufacturing or production tolerances, e.g. with respect to the thickness of the pane, are also compensated for, provided that the range of spring of the seals 74, 76, 80 and 82 used, is not exceeded.

Alternatively, it is also possible to provide an air gap between the panes 56 and 58. It also acts as a thermal insulation such that this embodiment is particularly suitable for high-performance curing devices 10.

Alternatively, it is also possible to realize the pane 56 and 58 such that the inside of the pane 58, i.e. towards the interior 36, is provided with a partially reflective layer which is configured similar to the coating 60 and replaces the pane 56. In this case, the pane 58 is considerably thicker, e.g. 6 mm or 8 mm.

This solution is considered for low-performance/low power curing devices 10 as the embodiment with the separate glass pane 56 is more heat-resistant.

For instance, 95% of the entering light radiation in the UV range is absorbed and in the range above 500 nm less than 10% is absorbed, i.e. more than 90% is let through or transmitted.

Thus, the entire transmission characteristic of the window pane 22 allows for the dental restoration part 54 to be viewed from the outside, even while the light source 38 is turned on, but without being dangerous for the viewer due to escaping UV radiation.

It is to be understood that the invention is not limited to the illustrated embodiment. An additional layer made of bulletproof glass may be provided for instance, or the glass layer 56 may be reinforced correspondingly.

The thickness of the plastic layer 58 may be adapted to the requirements in a wide range, preferably, it is substantially as thick as the glass layer 56.

The invention claimed is:

1. A polymerization and post-tempering device for tempering dental restoration parts made of polymerizable plastics comprising
at least one light source which emits light in the visible and/or ultraviolet wavelength range,
a light chamber which comprises the at least one light source,
a door to the light chamber,
wherein at least one wall comprises a window (20) with a window pane (22) which comprises at least two layers having one layer (56) facing the light chamber (36) reflecting at least 90% light, and another layer (58) facing away from the light chamber (36) filtering out UV light and/or blue light.

2. The polymerization and post-tempering device as claimed in claim 1,
wherein the device is configured to perform tempering of dental restoration parts,
wherein the tempering comprises post-tempering,
wherein the dental restoration parts are produced by stereolithography,
wherein the at least one wall comprising the window is a door,
wherein the one layer facing the light chamber reflects at least 95% of light.

3. The polymerization and post-tempering device as claimed in claim 1,
wherein the window (20) has a height-to-width ratio of at least 2 to 1.

4. The polymerization and post-tempering device as claimed in claim 1,
wherein the window (20) has a height-to-width ratio of at least 4 to 1.

5. The polymerization and post-tempering device as claimed in claim 1,
wherein the window (20) is mounted in a door leg (34) of the door which blocks the emitted light to the outside when viewed obliquely.

6. The polymerization and post-tempering device as claimed in claim 1,
wherein the window (20) is mounted centrally and low-lying in the door (14) at a depth which corresponds to at least 60% of the width of the window (20).

7. The polymerization and post-tempering device as claimed in claim 1,
wherein the window (20) is substantially flush with an inside side of the door (14).

8. The polymerization and post-tempering device as claimed in claim 1,
wherein the window (20) is mounted at the door (14) by a light-tight seal and/or a labyrinth seal.

9. The polymerization and post-tempering device as claimed in claim 1,
wherein a screen (42) on an inside side of the door (14) is colored black or coated black.

10. The polymerization and post-tempering device as claimed in claim 1,
wherein the layer (56) of the window pane (22) facing the light chamber (36) reflects light to one side, towards the light chamber (36).

11. The polymerization and post-tempering device as claimed in claim 1,
wherein the window pane (22) comprises two layers (56, 58) which are applied to one another directly without a separating layer of air.

12. The polymerization and post-tempering device as claimed in claim 1,
wherein the layer (58) facing away from the light chamber (36) comprises a plastic material which is transparent and forms an edge filter for UV-light and/or blue light.

13. The polymerization and post-tempering device as claimed in claim 1,
wherein the window pane (22) recedes compared to the rest of the door (14), more at a front side (32) than on an inside side of the door, when viewed both from the front side (32) of the door (14) and from inside of the door (14), or from the light chamber (36).

14. The polymerization and post-tempering device as claimed in claim 1,
wherein when the door (14) is closed, the window pane (22) filters out at least 70%, of visible light, and at least 95% of UV light of the radiation emitted by the at least one light source (38).

15. The polymerization and post-tempering device as claimed in claim 1,
wherein when the door (14) is closed, the window pane (22) filters out at least 85% of visible light, and at least 95% of UV light of the radiation emitted by the at least one light source (38).

16. The polymerization and post-tempering device as claimed in claim 1,
wherein the window pane (22) has a width of less than 50 mm.

17. The polymerization and post-tempering device as claimed in claim 1,
wherein the window pane (22) has a width of approximately between 30 and 40 mm.

18. The polymerization and post-tempering device as claimed in claim 1,
wherein the door comprises a door leg (34),
wherein the outer part of the window pane (22) where it overlaps the door leg (34), is covered by a screen (40) which extends across the entire inside of the door (14) except for a section which forms the window (12).

19. The polymerization and post-tempering device as claimed in claim 18,
wherein the screen (40) is configured to be reflective towards an interior (36) and is fabricated of metal.

* * * * *